United States Patent [19]

Martin et al.

[11] 4,428,595
[45] Jan. 31, 1984

[54] FIFTH WHEEL HITCH

[75] Inventors: Samuel A. Martin, Holland; Fredrick J. Bakker, West Olive, both of Mich.

[73] Assignee: Holland Hitch Company, Holland, Mich.

[21] Appl. No.: 353,038

[22] Filed: Mar. 1, 1982

[51] Int. Cl.³ .............................................. B62D 53/10
[52] U.S. Cl. .................................... 280/435; 280/506
[58] Field of Search ............... 280/435, 433, 434, 436, 280/506

[56] References Cited

U.S. PATENT DOCUMENTS

| | | | |
|---|---|---|---|
| 2,663,575 | 12/1953 | Ketel | 280/435 |
| 2,982,566 | 5/1961 | Geerds | 280/435 |
| 3,013,815 | 12/1961 | Geerds | 280/435 |
| 3,442,533 | 5/1969 | Walther | 280/435 |
| 3,640,549 | 2/1972 | Neff et al. | 280/435 |
| 4,106,793 | 8/1978 | Neff . | |

FOREIGN PATENT DOCUMENTS 1144733 10/1957 France ................................ 280/435

Primary Examiner—Joseph F. Peters, Jr.
Assistant Examiner—Donn McGiehan
Attorney, Agent, or Firm—Price, Heneveld, Huizenga & Cooper

[57] ABSTRACT

A fifth wheel hitch includes a kingpin locking mechanism having a pair of pivoting locking jaws which form a socket in which the kingpin is retained. An adjustment device varies the angular position of the closed jaws to vary the side-to-side dimension of the socket, and thereby compensate for side wear in the hitch. A stationary, semicircular bearing is fixedly mounted in the hitch to form a portion of the forward half of the socket, such that pivotal adjustment of the closed jaws also varies the fore-to-aft dimension of the socket, and thereby compensate for end wear in the hitch.

14 Claims, 12 Drawing Figures

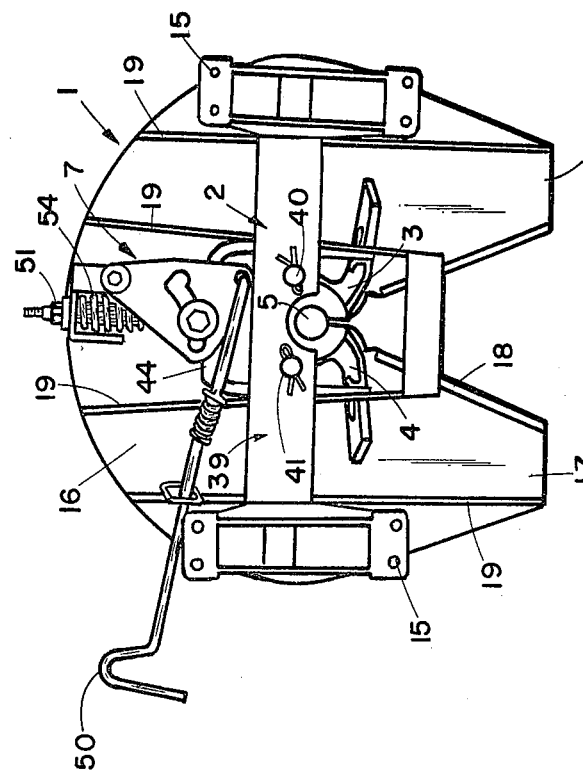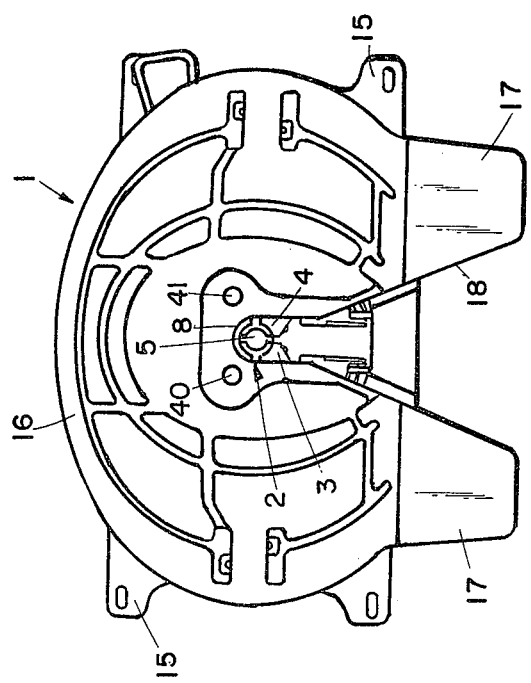

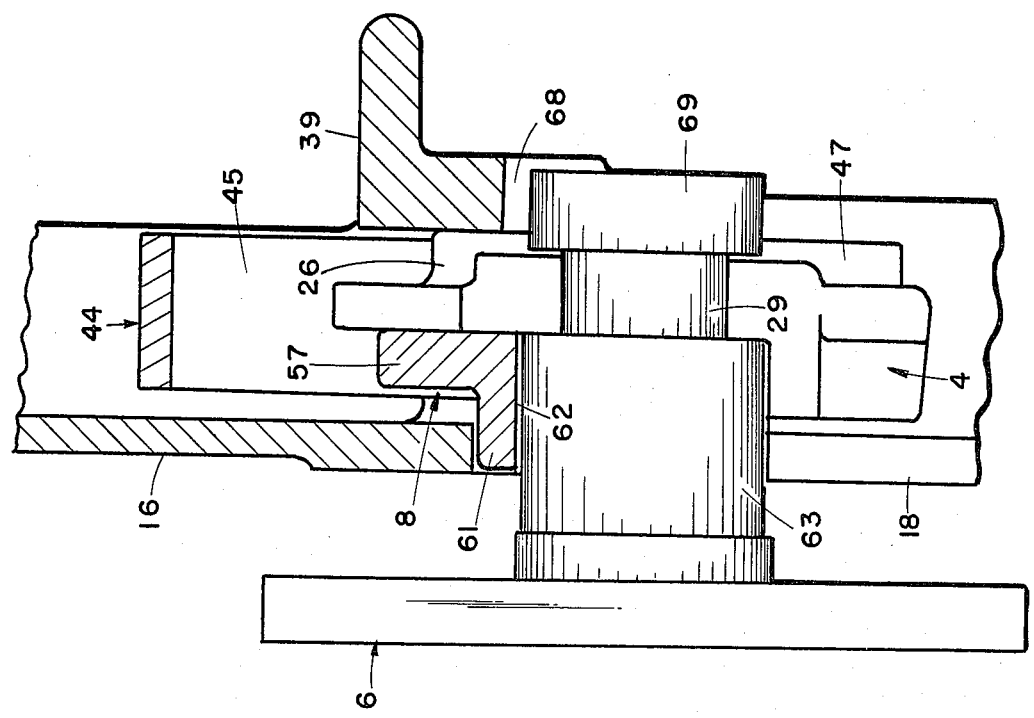
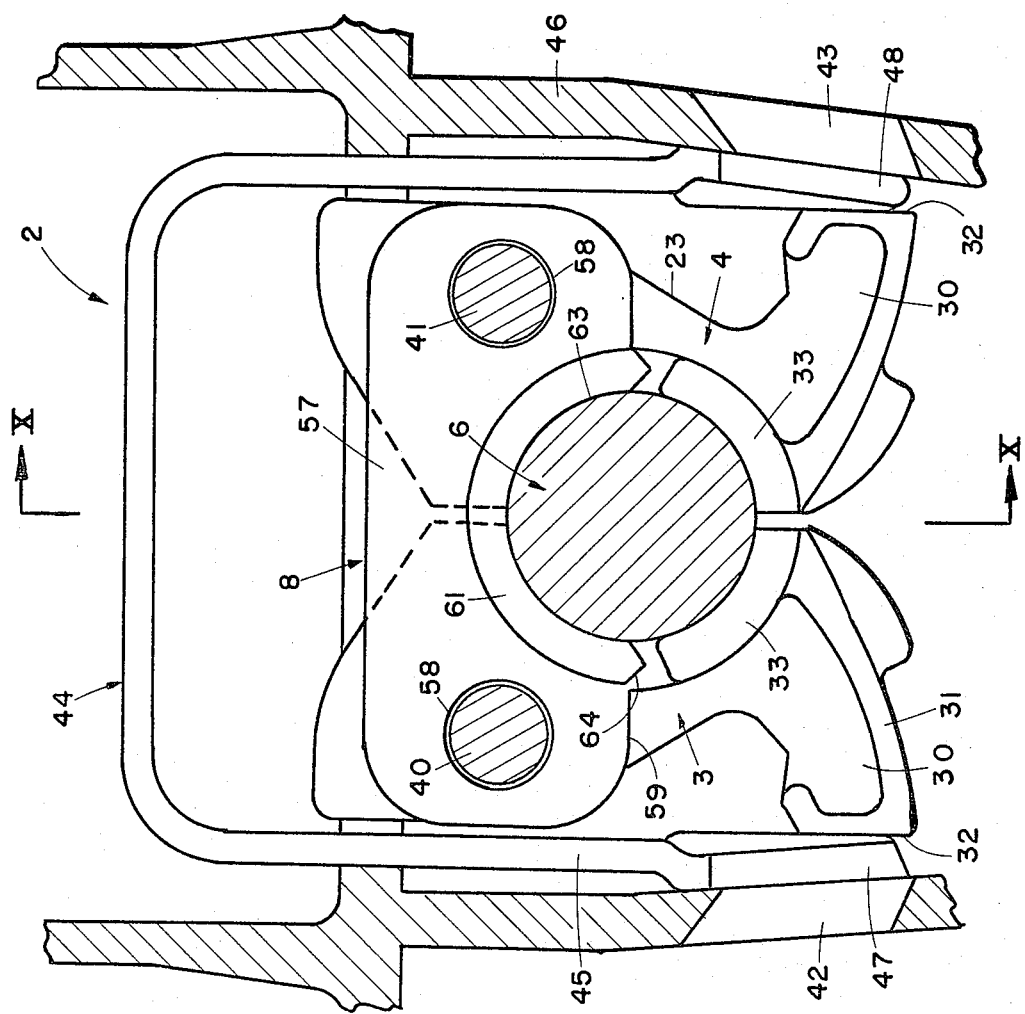

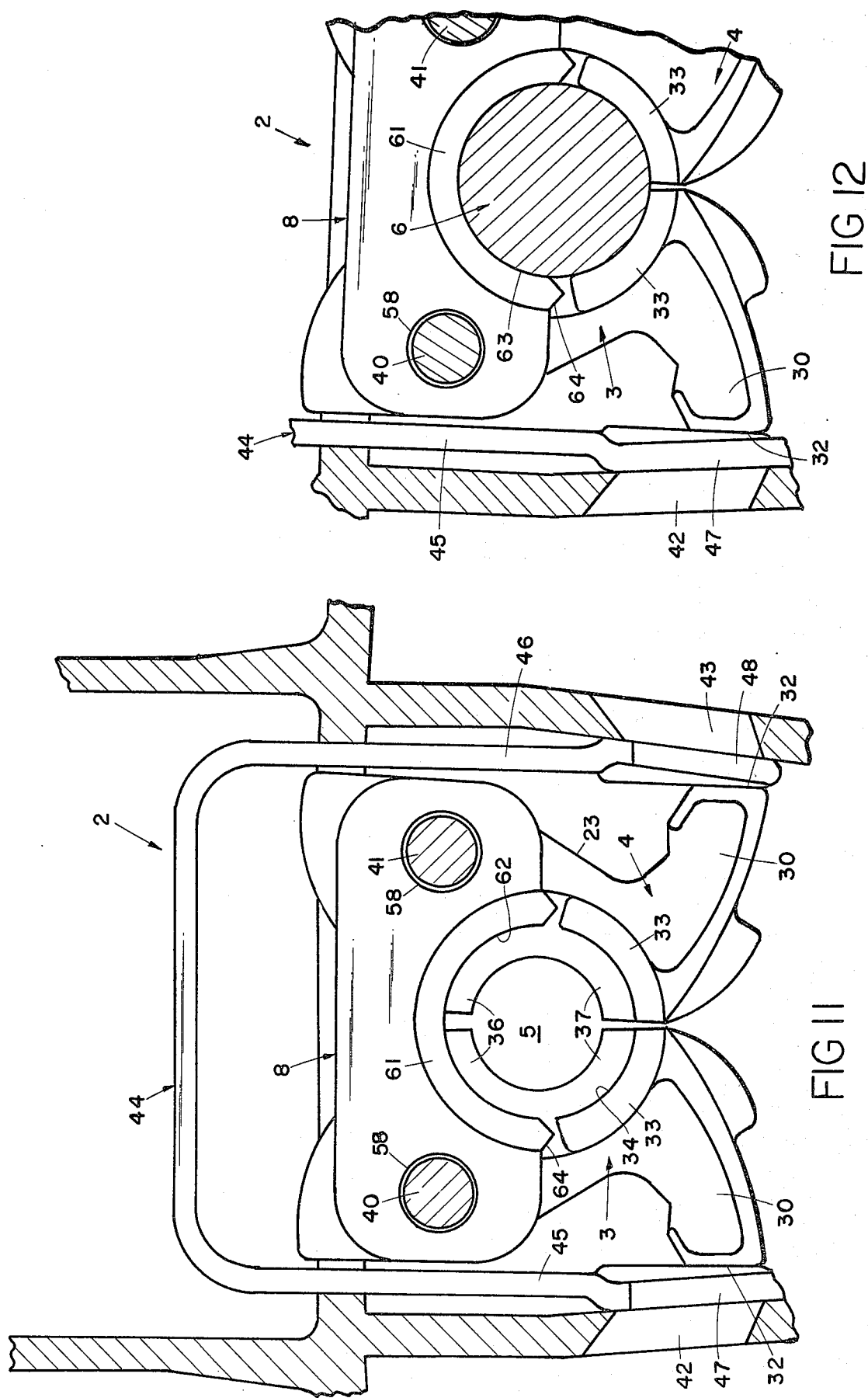

FIFTH WHEEL HITCH

BACKGROUND OF THE INVENTION

The present invention relates to fifth wheel assemblies, and in particular to an improved kingpin locking mechanism therefor.

Kingpin locking mechanisms for fifth wheel assemblies, such as those disclosed in U.S. Pat. Nos. 2,663,575; 2,982,566; 3,013,815; 3,640,549 and 4,106,793, which are hereby incorporated by reference, are generally known in the art. Such mechanisms include a pair of pivoting jaws which are closed to form a socket in which the kingpin is retained. An adjustment device is provided to vary the angular orientation of the jaws in the closed position to take up slack in the hitch which is caused by wear.

Although prior adjustable locking mechanisms have proved satisfactory in compensating for side-to-side wear in the hitch, they have been less than fully effective in compensating for fore-to-aft wear in the hitch. This results from the fact that as the left-hand and right-hand jaws are pivotally adjusted inwardly at their rearward ends to close more tightly about the kingpin, the fore-to-aft dimension of the socket does not vary substantially. Since a great majority of the wear which occurs in the socket is in the fore-to-aft direction, it would be highly advantageous to provide a mechanism which compensates for both side-to-side and fore-to-aft wear.

SUMMARY OF THE INVENTION

One aspect of the present invention is a fifth wheel hitch of the type having left-hand and right-hand pivoting jaws, which includes a stationary, arcuate bearing that forms a portion of the forward half of the socket. The bearing is fixed with respect to the central axis of the socket, such that pivotal adjustment of the jaws varies both the side-to-side dimension and the fore-to-aft dimension of the socket to compensate for both the side and end wear in the hitch.

The principal objects of the present invention are to provide an adjustable locking mechanism for fifth wheel hitches which is capable for compensating for both side-to-side and fore-to-aft wear. The present invention has a very uncomplicated construction which is economical to manufacture, and very reliable. Preferably, the bearing extends continuously about the forward half of the socket, and upwardly through the fifth wheel plate to provide additional contact area with the kingpin which improves wear resistance. The adjustable locking mechanism is efficient in use, capable of a long operating life, and particularly well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a top plan view of a fifth wheel assembly having an adjustable hitch embodying the present invention.

FIG. 2 is a bottom plan view of the fifth wheel assembly and hitch.

FIG. 9 is a fragmentary horizontal, cross-sectional view of the fifth wheel assembly, with the hitch shown in a closed, locked position about a kingpin.

FIG. 10 is a fragmentary vertical cross-sectional view of the fifth wheel assembly, taken along the line X—X of FIG. 9.

FIG. 11 is a fragmentary horizontal, cross-sectional view of the fifth wheel assembly, with the hitch shown in an inwardly adjusted position.

FIG. 12 is a fragmentary, horizontal, cross-sectional view of the inwardly adjusted hitch shown in FIG. 11 with a kingpin positioned therein.

DETAILED DESCRIPTION OF THE PREFERRED EMBODIMENTS

Figure 4:
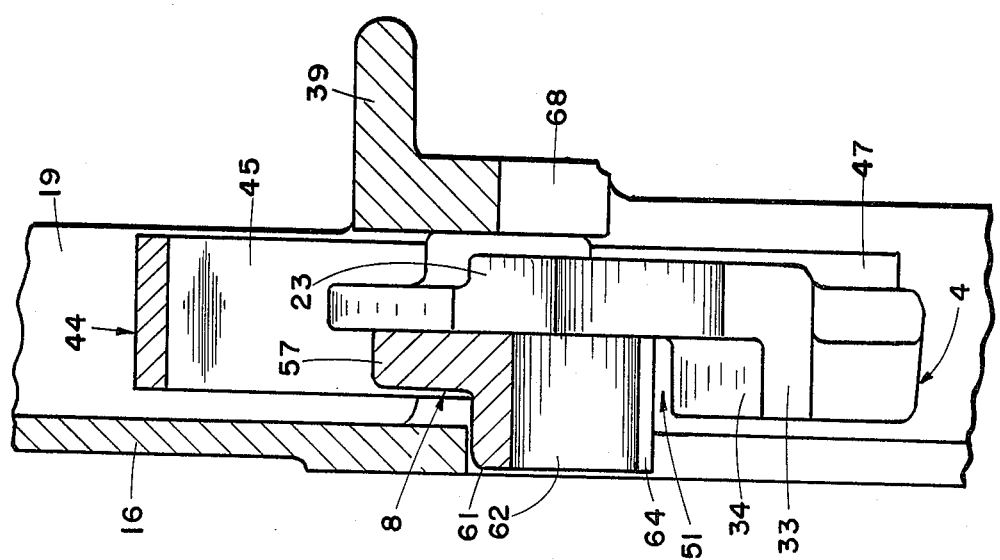
FIG. 4 is a fragmentary vertical cross-sectional view of the hitch, taken along the line IV—IV of FIG. 3.
Figure 3:
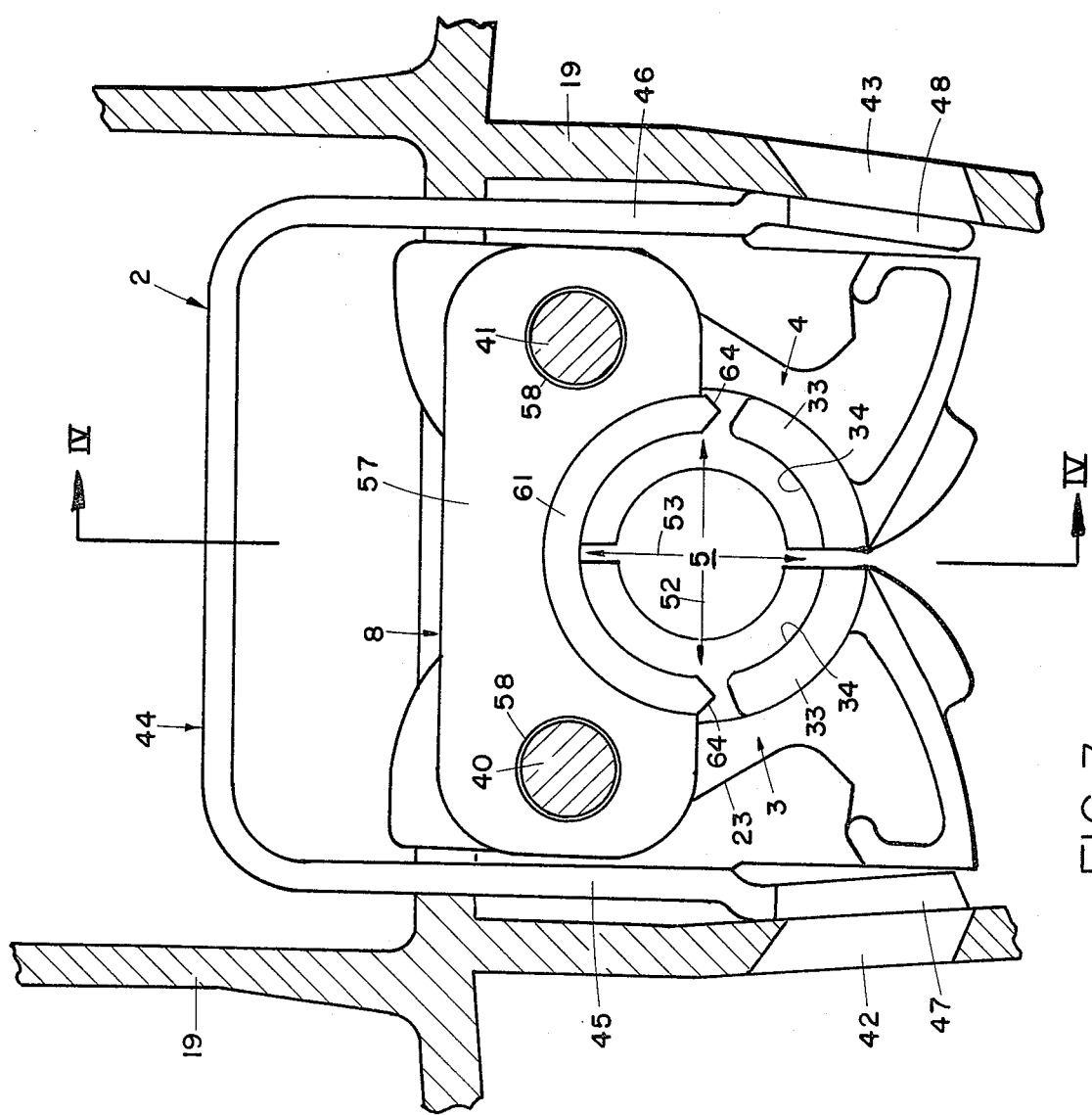
FIG. 3 is a fragmentary horizontal cross-sectional view of the fifth wheel assembly, particularly showing the hitch in a closed, locked position.

For purposes of description herein, the terms "upper," "lower," "right," "left," "rear," "front," "vertical," "horizontal" and derivatives thereof shall relate to the invention as oriented in FIGS. 1, 3 and 4. However, it is to be understood that the invention may assume various alternative orientations, except where expressly specified to the contrary.

The reference numeral 1 (FIG. 1) generally designates a fifth wheel assembly having a hitch arrangement 2 embodying the present invention. Hitch 2 comprises a kingpin locking mechanism having a pair of pivoting locking jaws 3 and 4 which form a socket 5 in which a kingpin 6 (FIGS. 9 and 10) is retained. An adjustment device 7 (FIG. 2) varies the angular position of the closed jaws 3 and 4 to vary the side-to-side dimension of socket 5, and thereby compensate for side wear in hitch 2. A stationary, semicircular bearing 8 (FIGS. 3 and 4) is fixedly mounted in hitch 2 to form a portion of the forward half of socket 5, such that pivotal adjustment of the closed jaws 3 and 4 also varies the fore-to-aft dimension of socket 5, and thereby compensate for end wear in hitch 2.

The fifth wheel assembly 1 in which the present hitch 2 is connected is a conventional structure, and comprises a trunnion bracket 15 which pivotally connects a fifth wheel plate 16 to the frame of a vehicle (not shown). Fifth wheel plate 16 includes a pair of downwardly inclined tongue 17, and a tapered slot 18 which guides kingpin 6 into hitch 2. A plurality of depending ribs 19 are integrally formed on the lower surface of fifth wheel plate 16, and form a structure in which hitch 2 is housed, as described in greater detail hereinafter.

Figure 5:
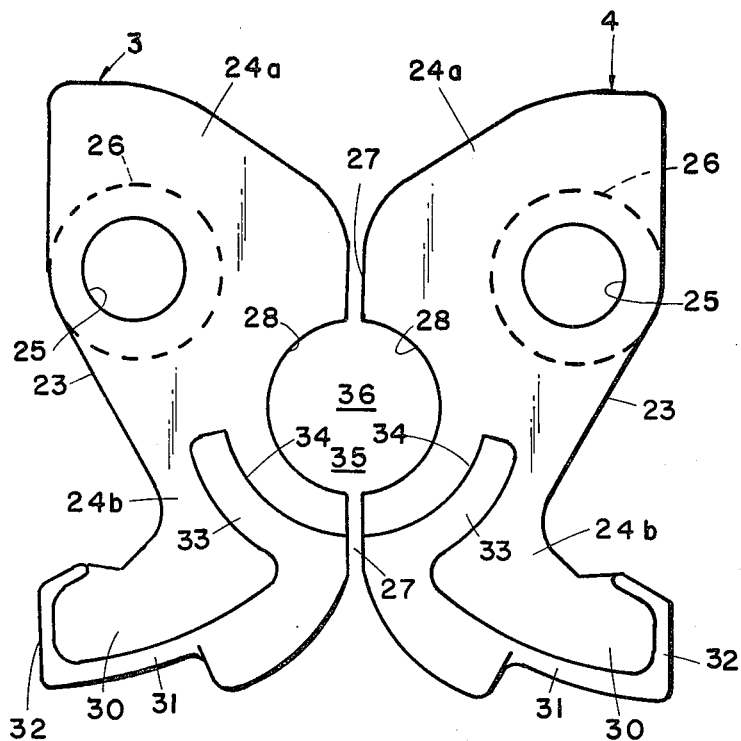
FIG. 5 is a top plan view of a pair of jaw portions of the hitch.
Figure 6:
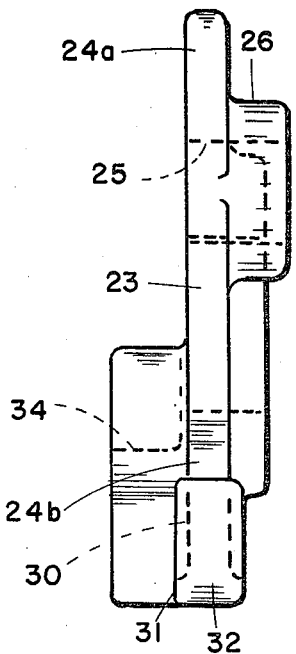
FIG. 6 is a side elevational view of the jaw.
Figure 7:
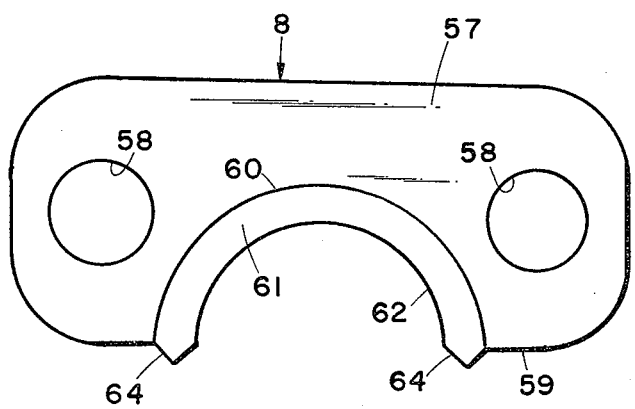
FIG. 7 is a top plan view of a stationary bearing portion of the hitch.
Figure 8:
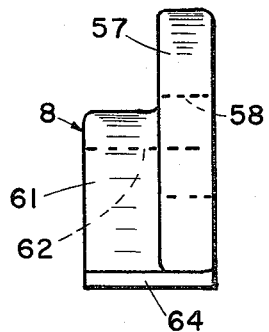
FIG. 8 is a side elevational view of the stationary bearing.

Locking jaws 3 and 4 are positioned on the left and right-hand sides of fifth wheel slot 18, as viewed in top plan. Jaws 3 and 4 have a substantially identical construction, except that they are shaped for assembly in the left- and right-hand sides of hitch 2. Jaws 3 and 4 have a plate-shaped body 23 (FIGS. 5 and 6), with a generally flat upper, forward portion 24a with an aperture 25 extending therethrough. An integrally formed boss 26 depends from the lower surface of body 2 about aperture 25. The inwardly disposed side edges 27 of jaws 3 and 4 include semicircular cutouts 28 which form left- and right-hand portions of kingpin socket 5, and are adapted to mate with the smaller diameter portion or neck 29 of kingpin 6. The rearward portion 24b of the jaw bodies 23 includes laterally extending ears 30, having a web 31 along the exterior sides thereof that forms a flat abutment surface 32 which mates with the adjustment device 7, as described in greater detail hereinafter. An integrally formed rim 33 extends upwardly from the upper surfaces of jaw bodies 23, and defines a pair of arcuately shaped bearing surfaces 34 that are concentric with, and form a rearward half 35 of kingpin socket 5.

With reference to FIGS. 3 and 4, locking jaws 3 and 4 are pivotally mounted in fifth wheel assembly on pins 41 which extend through jaw apertures 25. In this example, pins 40 and 41 have their upper ends mounted in fifth wheel plate 16, and their lower ends mounted in an interior cross brace 39 connected with the lower edges of ribs 19. Apertures or windows 42 and 43 are formed in plate ribs 19, such that in the unlocked hitch position, the ears 30 of jaws 3 and 4 are pivoted through windows 42 and 43. A U-shaped yoke 44 is slidingly mounted between tapered plate ribs 19, and includes a pair of generally parallel legs 45 and 46 with wedge-shaped ends 47 and 48 respectively that engage the abutment surfaces 32 on jaw ears 30 to retain the jaws in a selected, closed position. A conventional adjustment device, such as the mechanism 7 illustrated in FIG. 2, is connected with yoke 44, and moves the same forwardly and rearwardly to lock and unlock jaws, and also adjusts the closed position of the jaws to insure close mating contact with kingpin 6. In the illustrated structure, jaws 3 and 4 are released from the locked position by manipulating handle 50, which withdraws yoke 44 from its position obstructing windows 42. Jaws 3 and 4 can then be pivoted into a fully open position to remove kingpin 6 from socket 5. When jaws 2 and 3 are closed and locked, adjustment nut 51 can be manipulated to vary the tension in coil spring 54, which shifts yoke 44 slightly in the fore-to-aft direction (in the orientation illustrated in FIGS. 3 and 9) to adjust for wear in hitch 2. Socket 5 is tightened about kingpin 6 by resiliently urging and moving yoke 44 rearwardly (toward socket 5) so that the rearward portions 24b of jaws 3 and 4 converge as illustrated in FIGS. 11 and 12. This adjustment is effective in varying the side-to-side dimension of the socket, which is illustrated by arrow 52 in FIG. 3. However, in prior adjustable hitches, the fore-to-aft dimension of socket 5, which is illustrated by arrow 53 in FIG. 3, is not varied substantially during this adjustment process. Hence, prior hitch arrangements have been very limited in their ability to take up wear in the fore-to-aft direction.

In the present invention, bearing 8 is stationary in the closed, locked jaw position, with respect to the central axis of socket 5, such that pivotal adjustment of jaws 3 and 4 also varies the fore-to-aft dimension 53 of socket 5 to compensate for end wear in hitch 2. Bearing 8 has a plate-shaped body 57 with a pair of apertures 58 extending therethrough. The rearward edge 59 of the bearing body 57 includes an arcuate cutout 60, with a similarly shaped, integral rim 61 upstanding therefrom. In this example, bearing 8 is forged. Rim 61 provides an arcuate bearing surface 62 which is adapted to engage the larger diameter portion or shoulder 63 of kingpin 6. Preferably, bearing surface 62 has a generally semicircular plan shape (180°), and extends continuously about cutout 60 to define a solid bearing surface. The end edges 64 of rim 61 are tapered, and have a generally V-shaped in plan view to facilitate guiding kingpin 6 into socket 5 without hitting the end edges of bearing 8.

In the illustrated example, bearing 8 is positioned above locking jaws 3 and 4, and is mounted on pins 40 and 41. Pins 40 and 41 extend through bearing apertures 58, and thereby fixedly mount the bearing in the hitch. However, it is to be understood that other suitable mounting arrangements such as welding bearing 8 to ribs 19, or the like, may be used to fixedly or adjustably mount bearing 8 in hitch 2, as described in greater detail hereinafter. The rim portion 61 of bearing 8 extends through the arcuate end of plate slot 18 to a height slightly below the uppermost surface of fifth wheel plate 16, thereby providing increased bearing surface area. The upper end of bearing rim 61 is thus positioned within the confines of fifth wheel plate 16. Since bearing 8 is not connected with pivoting jaws 3 and 4, but is stationary, the upstanding rim portion 61 of bearing 8 does not interfere with movement of jaws 3 and 4. When assembled, bearing 8 forms a portion of the forward half 36 of kingpin socket 5. As best illustrated in FIGS. 11 and 12, the forward half 36 of socket 5 is defined by bearing 8, and the forward quadrants (i.e., 90°) of the cutout edge 28 of jaws 3 and 4. The rearward half 35 of socket 5 is defined by the two bearing surfaces 34, and the rearward quadrants (i.e., 90°) of the cutout edge 28 of jaws 3 and 4. Cross brace 39 on the bottom of hitch 2 includes an arcuate cutout 68 to provide clearance for the lower end 69 of kingpin 6. The cutout edge 68 of cross brace 39 does not contact kingpin end 69, and does not form a part of socket 5.

As will be apparent to one having ordinary skill in the art, bearing 8 is designed to be fixed in hitch 2 when socket 5 is closed and locked. However, the present invention also contemplates means for adjusting the fore-to-aft position of bearing 8 in cases of extreme wear. Such means may include shims (not shown) positioned in the forward half of apertures 58. Also, bearing 8 could be mounted on threaded studs or the like (not shown), which when rotated would adjust the fore-to-aft position of bearing 8 with respect to the central axis of socket 5.

In operation, kingpin socket 5 is adjusted to take up wear by shifting yoke 44 rearwardly. Because bearing 8 is fixed with respect to the central axis of socket 5, as the rearward ends 24b of locking jaws 3 and 4 are converged, the fore-to-aft dimension 53 of socket 5 is decreased to take up end wear in the hitch. Hence, pivotal adjustment of jaws 3 and 4 not only compensates for side wear in the hitch, but also simultaneously and automatically compensates for end wear in the hitch.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a fifth wheel hitch having a support plate with an upper bearing surface and kingpin slot therethrough, and a pair of pivotally mounted jaws which are closed to define a socket in which a kingpin is retained in a locked position, and are opened to release said kingpin in an unlocked position; said socket having a generally vertically oriented central axis, and forward and rearward halves which define therebetween a fore-to-aft dimension and a side-to-side dimension; means for adjusting the angular position of said jaws in the closed, locked position for varying the side-to-side dimension of said socket to compensate for side wear in said hitch, the improvement comprising:

a stationary bearing connected with said hitch, and having an arcuate plan shape which mates with said kingpin and forms at least a portion of the forward half of said socket; said bearing being fixed during hitch loading with respect to the central axis of said socket, whereby pivotal adjustment of said jaws varies the fore-to-aft dimension of said socket to compensate for end wear in said hitch; said stationary bearing extending upwardly through said kingpin slot to an elevation slightly below the upper bearing surface of said support plate for improved wear resistance.

2. A trailer hitch as set forth in claim 1, wherein: said bearing shape is substantially semicircular.

3. A trailer hitch as set forth in claim 2, wherein: said bearing extends continuously about the forward half of said socket.

4. A trailer hitch as set forth in claim 3, wherein: said bearing is positioned above said jaws.

5. A trailer hitch as set forth in claim 4, wherein: said jaws are pivotally mounted on a pair of laterally spaced apart pins; and said bearing is fixedly mounted on said pins.

6. A trailer hitch as set forth in claim 5, wherein: said bearing comprises a flat plate having a semicircular opening through a rearward edge thereof, with a split sleeve upstanding from said flat plate.

7. A trailer hitch as set forth in claim 6, wherein: said split sleeve has wedge-shaped end edges.

8. A trailer hitch as set forth in claim 1, wherein: said bearing extends continuously about the forward half of said socket.

9. A trailer hitch as set forth in claim 1, wherein: said bearing is positioned above said jaws.

10. A trailer hitch as set forth in claim 1, wherein: said jaws are pivotally mounted on a pair of laterally spaced apart pins; and said bearing is fixedly mounted on said pins.

11. A trailer hitch as set forth in claim 1, wherein: said bearing comprises a flat plate having a semicircular opening through a rearward edge thereof, with a split sleeve upstanding from said flat plate.

12. A trailer hitch as set forth in claim 11, wherein: said split sleeve has wedge-shaped end edges.

13. In a fifth wheel hitch having a pair of jaws pivotally mounted on a pair of laterally spaced apart pins; said jaws being shaped such that when closed they define a socket therebetween in which a kingpin is retained in a locked position, and when opened they release said kingpin into an unlocked position; said socket having a generally vertically oriented central axis, and forward and rearward halves which define therebetween a fore-to-aft dimension and a side-to-side dimension; means for adjusting the angular position of said jaws in the closed, locked position for varying the side-to-side dimension of said socket to compensate for side wear in said hitch, the improvement comprising:

a stationary bearing connected with said hitch, and having an arcuate plan shape which mates with said kingpin and forms at least a portion of the forward half of said socket; said bearing being fixed during hitch loading with respect to the central axis of said socket, whereby pivotal adjustment of said jaws varies the fore-to-aft dimension of said socket to compensate for end wear in said hitch; said bearing having a pair of laterally spaced apart apertures through which said jaw mounting pins are closely received to fixedly mount said bearing in said hitch.

14. A trailer hitch as set forth in claim 13, wherein: said hitch includes a fifth wheel support plate having a kingpin slot therethrough and an upper bearing surface; and said stationary bearing extends upwardly through said kingpin slot to an elevation slightly below said upper bearing surface for improved wear resistance.

* * * * *